Aug. 19, 1930.  S. O. NELSON  1,773,372
PISTON
Filed Dec. 28, 1928
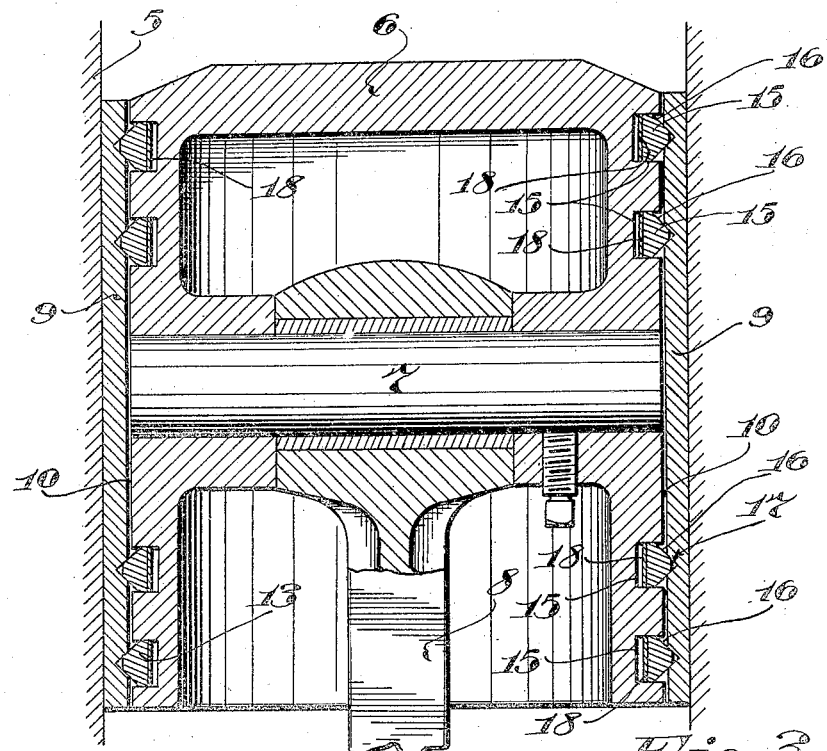
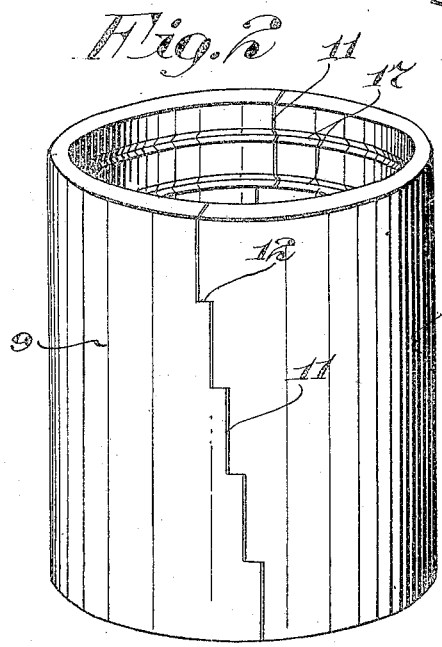
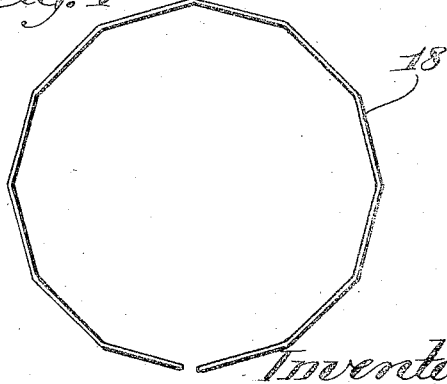
Inventor
Sam O. Nelson
By his Attorneys Patented Aug. 19, 1930

1,773,372

UNITED STATES PATENT OFFICE

SAM O. NELSON, OF MINNEAPOLIS, MINNESOTA

PISTON

Application filed December 28, 1928. Serial No. 329,018.

My present invention relates to a piston and more particularly to a piston for a reciprocating or internal combustion engine and having a combined sleeve and packing rings.

The object of the invention is the provision of a piston that is universally self adjustable to always keep a tight joint between the piston and cylinder wall by compensating for expansion, contraction, untrue axial alignment and wear, and prevents binding between the piston and cylinder wall, scoring of the cylinder, piston slaps and keeps said cylinder round. As the piston is self adjustable as to expansion and contraction, said piston and its sleeve may be made from the same metal or alloy, or from different metals or alloys and they may also be made from a different material from that of the cylinder walls.

In mounting this piston in the cylinder less care is required in aligning the same for the reason that the piston is self adjusting as to axial alignment with the cylinder. The advantages of always keeping a tight joint between a cylinder wall and piston is, as is well known, that it gives better compression and hence more power, a smoother running engine and more mileage per gallon of fuel. It also prevents the pumping of oil with the result that less oil is used and there is less carbon deposit on the valves and valve seats. A tight joint between the piston and the cylinder wall also prevents the escape of fuel onto the crank case with the result that less fuel is used, and with less carbon deposit in the crank case which is detrimental to the lubricant and bearings.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary view principally in central longitudinal section showing a piston mounted in a cylinder and having the invention embodied therein;

Fig. 2 is a perspective view of the sleeve removed from the piston;

Fig. 3 is an outer face view of one of the packing rings with a portion thereof broken away and sectioned; and Fig. 4 is a plan view of one of the springs.

The numeral 5 indicates one of the cylinders of an internal combustion engine and the numeral 6 indicates the body of the improved piston mounted in said cylinder for reciprocatory movement. Said piston body 6 is provided with the customary wrist pin 7 which connects the piston to a connecting rod 8.

Surrounding the piston 6 is a sleeve 9 which, as shown, extends the full length of said body and is radially spaced therefrom to leave clearance therebetween, as indicated at 10, to permit expansion and contraction of said body and sleeve in respect to each other. By reference to Fig. 2, it will be noted that the sleeve 9 is formed in two segmental sections with the longitudinal joints 11 therebetween and circumferentially staggered to form a plurality of circumferentially extended stop-cut joints 12. The joints 11 are never completely closed in order to permit free expansion and contraction of the sections of the sleeve 9 so that said sections always closely engages the wall of the cylinder 5 and can yield to prevent binding or sticking in respect thereto. Obviously, the joints 12 close the longitudinally extended joints 11 at a plurality of different points and form a continuous seal longitudinally of the piston. The outer face of the sleeve 9 is smooth and bears against the wall of the cylinder 5 throughout its entire length.

Interposed between the piston body 6 and sleeve 9 is a plurality of packing rings 13, as shown four, arranged in upper and lower pairs. These packing rings 13 are transversely divided and have stop-cut joints 14. The packing rings 13 are mounted in grooves 15 formed in the body of the piston 6 and their outer faces are V-shape in cross section, as indicated at 16, and are seated in V-shape grooves 17 formed in the inner face of the sleeve 9. To compensate for wear between the V-shape faces of the ring 13 and the V-shape grooves 17 said faces are truncated to permit the wearing of the rings 13 into the sleeve 9.

A transversely divided annular spring 18 is mounted in each groove 15 back of the respective ring 13 for yieldingly pressing said ring outward into its grooves 17 to seal the joint between the piston body 6 and the sleeve 9. The springs 18 are bent to polygonal form to provide a multiplicity of circumferentially spaced shoulders which bear against the piston body 6 at the bottom of the grooves 15 and yieldingly hold the rings 13 axially centered in respect to the piston body 6 and which rings in turn yieldingly hold the piston body 6 axially centered in respect to the sleeve 9.

In addition to the action of the springs 18 to expand the rings 13 onto the sleeve 9 said rings in themselves are under spring tension to expand into the grooves 17. Obviously, the rings 13 and springs 18 will permit free expanding and contracting movements of the sleeve 9 and at the same time always insure a tight joint between the piston body 6 and sleeve 9. The V-shape or beveled engagement between the sleeve 9 and rings 13 not only insure a tight joint therebetween but permits slight axial movement of the piston body 6 in respect to the sleeve 9 to compensate for expansion and contraction. The rings 13 further permit a slight angular movement of the piston body 6 in respect to the sleeve 9 in case the piston is not in true axial alignment with the sleeve 9.

By reference to Fig. 1, it will be noted that the outer rings 13 are located relatively close to the ends of the sleeve 9 and thereby firmly hold the same in contact with the wall of the cylinder 5 and form a long bearing surface that always keeps the wall of the cylinder round. As the wrist pin 7 is entirely within the sleeve 9 there is no danger of said pin scoring the cylinder wall.

What I claim is:

1. A piston comprising a body, a circumferentially expansible sectional sleeve surrounding the body and radially spaced therefrom to leave clearance between the body and sleeve, and packing rings mounted in grooves in the body and sleeve, one face of the rings having cam acting engagement with the grooves into which they project.

2. A piston comprising a body, a circumferentially expansible sectional sleeve surrounding the body and radially spaced therefrom to leave clearance between the body and sleeve, and packing rings mounted in grooves in the body and sleeves, one face of the rings being beveled in cross section and the grooves into which they project also being beveled in cross section.

3. A piston comprising a body, a circumferentially expansible sectional sleeve surrounding the body and radially spaced therefrom to leave clearance between the body and sleeve, and packing rings mounted in grooves in the body and sleeve, one face of the rings being V-shape in cross section and the grooves in which they project also being V-shape in cross section.

4. A piston comprising a body, a circumferentially expansible sectional sleeve surrounding the body and radially spaced therefrom to leave clearance between the body and sleeve, said sleeve extending substantially the full length of the body, upper and lower spring expanded packing rings mounted in grooves in the body and sleeve, the outer faces of the rings and the grooves in the sleeve being V-shape in cross section and connecting the body to the sleeve for slight universal movements.

5. A piston comprising a body, an expansible sleeve surrounding the body and radially spaced therefrom to leave clearance between the body and sleeve to permit slight universal radial movement of the body in the sleeve, the body and sleeve at their opposing faces being entirely free and separate from each other and an expansible packing member mounted in grooves in the body and sleeve with freedom to compensate for said universal radial movement of the body member in the sleeve.

6. A piston comprising a body, an expansible sleeve surrounding the body and radially spaced therefrom to leave clearance between the body and sleeve to permit slight universal radial and angular movements of the body in the sleeve, and an expansible packing member mounted in grooves in the body and sleeve with freedom to compensate for said universal radial and angular movements of the body member in the sleeve.

7. A piston comprising a body, an expansible sleeve surrounding the body and radially spaced therefrom to leave clearance between the body and sleeve to permit slight universal radial and angular movements of the body in the sleeve, and an expansible packing member mounted in grooves in the body and sleeve with freedom to compensate for said universal and radial movements of the body in the sleeve, said packing member having axial slippage in certain of the grooves to permit slight axial movement of the sleeve in respect to the body member.

In testimony whereof I affix my signature.

SAM O. NELSON.